US006882922B2

(12) United States Patent
Lee et al.

(10) Patent No.: US 6,882,922 B2
(45) Date of Patent: Apr. 19, 2005

(54) TORQUE-BIASING SYSTEM

(75) Inventors: Hyeongcheol Lee, Ann Arbor, MI (US); Clive McKenzie, Southfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 47 days.

(21) Appl. No.: 10/129,406

(22) PCT Filed: Oct. 11, 2001

(86) PCT No.: PCT/US01/31810

§ 371 (c)(1),
(2), (4) Date: Oct. 9, 2002

(87) PCT Pub. No.: WO02/31644

PCT Pub. Date: Apr. 18, 2002

(65) Prior Publication Data

US 2004/0024511 A1 Feb. 5, 2004

Related U.S. Application Data

(60) Provisional application No. 60/239,486, filed on Oct. 11, 2000.

(51) Int. Cl.$^7$ .............................................. G06F 19/00
(52) U.S. Cl. ......................... 701/89; 701/69; 180/197
(58) Field of Search .............................. 701/69, 84, 87, 701/89; 180/197; 475/84, 86; 477/77

(56) References Cited

U.S. PATENT DOCUMENTS

| 473,444 A | 4/1892 | Barney |
|---|---|---|
| 1,677,996 A | 7/1928 | Wingquist |
| 2,175,520 A | 10/1939 | Frederickson |
| 2,623,619 A | 12/1952 | Clerk |
| 2,986,024 A | 5/1961 | Power |
| 3,118,292 A | 1/1964 | Schroter et al. |
| 3,350,961 A | 11/1967 | Dodge |
| 3,724,289 A | 4/1973 | Kennicutt |

(Continued)

FOREIGN PATENT DOCUMENTS

| EP | 0825362 | 2/1998 |
|---|---|---|
| EP | 0886083 | 12/1998 |
| EP | 0911204 | 4/1999 |
| GB | 2 187 824 A | 9/1987 |
| GB | 2252801 | 2/1992 |
| JP | 401182127 | 7/1989 |
| JP | 1261553 | 10/1989 |
| JP | 200062495 | 2/2000 |
| JP | 200074096 | 3/2000 |
| JP | 2001-163079 | 6/2001 |

OTHER PUBLICATIONS

WO 94/29618, Published Dec 22, 1994, Applicant: Vrijburg, International Application No. PCT/NL94/00130, entitled: Differential With Continuous Variable Power Distribution.

(Continued)

*Primary Examiner*—Gary Chin
(74) *Attorney, Agent, or Firm*—Brinks Hofer Gilson & Lione

(57) ABSTRACT

A torque-biasing system (10) including a torque-biasing device (12) and a control unit (14) for use in a vehicle (16). The torque-biasing system is preferably installed and used in a vehicle having a first wheel (18) with a first rotational speed and a second wheel (20) with a second rotational speed, and an engine (22) with a torque output. The control unit (14) calculates an error value based on a different between the first rotational speed and second rotational speed and derives a control signal based upon proportional and integral terms of the error value with a forgetting factor. The control unit then sensor the control signal to the torque-biasing device (12).

12 Claims, 1 Drawing Sheet

U.S. PATENT DOCUMENTS

| | | | |
|---|---|---|---|
| 3,831,461 A | 8/1974 | Mueller | |
| 4,012,968 A | 3/1977 | Kelbel | |
| 4,462,272 A | 7/1984 | Roper | |
| 4,493,227 A | 1/1985 | Schmid | |
| 4,630,505 A | 12/1986 | Williamson | |
| 4,633,735 A | 1/1987 | Sakurai et al. | |
| 4,676,336 A | 6/1987 | Hiramatsu et al. | |
| 4,719,817 A | 1/1988 | Azuma | |
| 4,719,998 A | 1/1988 | Hiramatsu et al. | |
| 4,730,514 A | 3/1988 | Shikata et al. | |
| 4,779,698 A | 10/1988 | Iwata | |
| 4,838,118 A | 6/1989 | Binkley | |
| 4,841,809 A | 6/1989 | Jolly | |
| 4,867,012 A | 9/1989 | McGarraugh | |
| 4,884,653 A * | 12/1989 | Kouno | 180/233 |
| 4,905,808 A | 3/1990 | Tomita et al. | |
| 4,949,594 A | 8/1990 | Galhotra | |
| 4,960,011 A | 10/1990 | Asano | |
| 4,966,268 A | 10/1990 | Asano et al. | |
| 4,974,471 A | 12/1990 | McGarraugh | |
| 4,987,967 A * | 1/1991 | Kouno | 180/233 |
| 4,995,491 A | 2/1991 | Hiramatsu et al. | |
| 5,007,886 A | 4/1991 | Holmquist et al. | |
| RE33,742 E | 11/1991 | Blessing et al. | |
| 5,092,825 A | 3/1992 | Goscenski, Jr. et al. | |
| 5,132,908 A * | 7/1992 | Eto et al. | 701/89 |
| 5,172,787 A | 12/1992 | Kobayashi | |
| RE34,209 E | 3/1993 | McGarraugh | |
| 5,189,930 A | 3/1993 | Kameda | |
| 5,194,053 A | 3/1993 | Sano et al. | |
| 5,201,820 A | 4/1993 | Hamada et al. | |
| 5,415,598 A | 5/1995 | Sawase et al. | |
| 5,445,574 A | 8/1995 | Sekiguchi et al. | |
| 5,456,641 A | 10/1995 | Sawase | |
| 5,469,950 A | 11/1995 | Lundstrom et al. | |
| 5,536,215 A | 7/1996 | Shaffer et al. | |
| 5,542,316 A | 8/1996 | Spooner et al. | |
| 5,690,002 A | 11/1997 | Showalter | |
| 5,735,764 A | 4/1998 | Shaffer et al. | |
| 5,827,145 A | 10/1998 | Okcuoglu | |
| 5,888,163 A | 3/1999 | Shaffer et al. | |
| 5,893,812 A | 4/1999 | Narai et al. | |
| 5,915,513 A | 6/1999 | Islev, Jr. et al. | |
| 5,916,052 A | 6/1999 | Dick | |
| 5,938,555 A | 8/1999 | Leeper | |
| 5,938,556 A | 8/1999 | Lowell | |
| 5,941,788 A | 8/1999 | Shaffer et al. | |
| 5,964,126 A | 10/1999 | Okcuoglu | |
| 5,979,631 A | 11/1999 | Lundstrom | |
| 5,984,822 A | 11/1999 | Schreier et al. | |
| 6,001,040 A | 12/1999 | Engle | |
| 6,019,694 A | 2/2000 | Forrest et al. | |
| 6,048,286 A | 4/2000 | Perry | |
| 6,056,658 A | 5/2000 | Illmeier | |
| 6,095,939 A | 8/2000 | Burns et al. | |
| 6,119,061 A | 9/2000 | Schenkel et al. | |
| 6,176,800 B1 | 1/2001 | Shaffer et al. | |
| 6,186,258 B1 | 2/2001 | Deutschel et al. | |
| 6,213,241 B1 | 4/2001 | Kita et al. | |
| 6,216,841 B1 | 4/2001 | Hofer | |
| 6,332,522 B1 | 12/2001 | Morse et al. | |
| 6,449,552 B1 * | 9/2002 | Ohba et al. | 701/89 |
| 6,487,486 B1 * | 11/2002 | Anderson | 701/69 |
| 6,498,974 B1 * | 12/2002 | Rodrigues et al. | 701/69 |
| 2004/0059491 A1 * | 3/2004 | Yoneda et al. | 701/69 |
| 2004/0059494 A1 * | 3/2004 | Yoneda | 701/89 |

OTHER PUBLICATIONS

WO 87/06668, Published Nov. 5, 1987, Applicant: Scheidegger, Zwicky, Werner & Co., International Application No. PCT/CH86/00060.

WO 00/12915, Published Mar. 9, 2000, Applicant: McLaren Automotive Group, International Application No. PCT/US99/20054.

M. Okcuoglu, "A Descriptive Analysis of Gerodisc Type Limited Slip Differentials and All Wheel Drive Couplings", Society of Automotie Engineers, Inc. Copyright 1995, pp. 15–20.

* cited by examiner

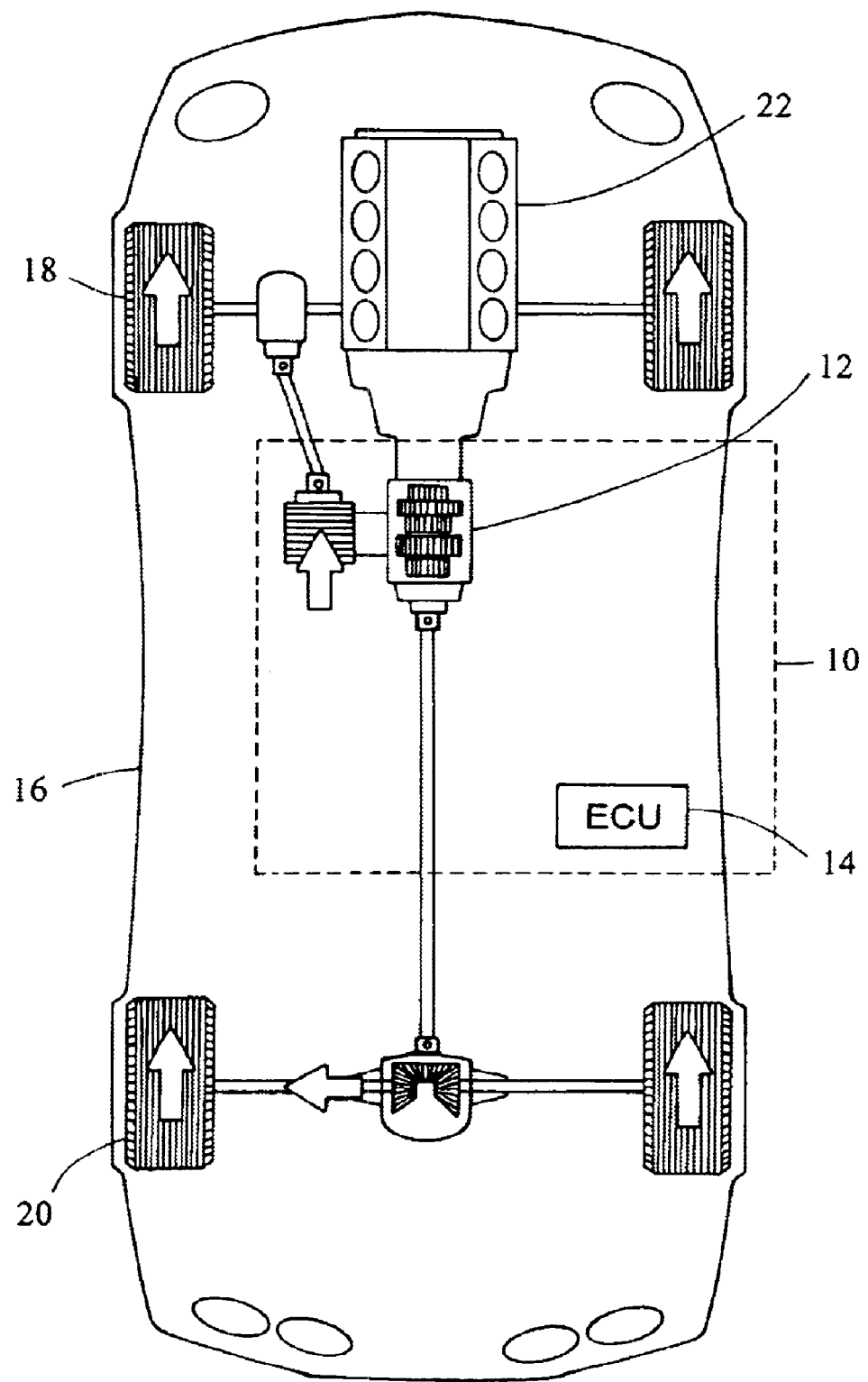

TORQUE-BIASING SYSTEM

CROSS-REFERENCE TO OTHER APPLICATIONS

The application on this invention relates to U.S. Provisional Patent Application Ser. No. 60/239,486, filed Oct. 11, 2000 and entitled "TORQUE CONTROL DEVICE".

TECHNICAL FIELD

This invention relates generally to the field of torque-biasing systems and, more particularly, to the field of torque-biasing systems for a vehicle with a first wheel and a second wheel.

BACKGROUND

Some conventional vehicles include all-wheel-drive capabilities. These vehicles power two wheels during high-traction situations to enhance fuel-economy, and power all four wheels during reduced-traction situations to enhance road traction and stability. Torque-biasing devices are conventionally used to transfer the torque output from the engine source away from a first wheel and towards a second wheel during the reduced-traction situation.

During a reduced-traction situation, one of the wheels of the vehicle often has a much faster rotational speed than another wheel. Torque-biasing devices are conventionally controlled based upon the difference between the rotational speeds of a first wheel and a second wheel. More specifically, the torque-biasing devices are conventionally controlled based upon a mathematical equation including a proportional term and an integral term of this rotational speed difference.

The proportional term of the control allows the torque-biasing device to understand the current state of the vehicle. Quite simply, the torque-biasing device is activated if there is a large difference between the rotational speeds of the first wheel and the second wheel. Once the torque-biasing device is activated, the vehicle powers all four wheels and the rotational speed difference may approach zero. When the rotational speed difference approaches zero, the proportional term approaches zero and—without the integral term—the torque-biasing device is de-activated. The vehicle, however, may still be experiencing a reduce-traction situation. For this reason, the torque-biasing device needs to "remember" the past situations. This is conventionally accomplished with the integral term.

The integral term allows the torque-biasing device to understand the past states of the vehicle. Since both the proportional term and the integral term conventionally use an absolute value of the rotational speed difference, the integral term is a positive value, which will always effect the control of the torque-biasing device despite the time elapse between reduced-traction situation and the current state of the vehicle. Thus, there is a need in the field of torque-biasing systems to provide a torque-biasing system that balances the need to "remember" the past situations, but eventually "forgets" them to avoid any negative affect on the torque-biasing device.

BRIEF DESCRIPTION OF THE FIGURE

FIG. 1 is a schematic view of the toque-biasing system of the preferred embodiment, shown in a vehicle.

DESCRIPTION OF THE PREFERRED EMBODIMENT

The following description of the preferred embodiment of the invention is not intended to limit the invention to this preferred embodiment, but rather to enable any person skilled in the art of torque-biasing systems to make and use an embodiment of the invention.

As shown in FIG. 1, the torque-biasing system 10 of the preferred embodiment includes a torque-biasing device 12 and a control unit 14. The torque-biasing system 10 is preferably installed and used in a vehicle 16 having a first wheel 18 with a first rotational speed, a second wheel 20 with a second rotational speed, and an engine 22 with a torque output. More preferably, the torque-biasing system 10 is installed and used in an all-wheel-drive ("AWD") vehicle, such as a truck or so-called sport-utility-vehicle, having two front wheels with the first wheel 18 as a front wheel, two rear wheels with the second wheel 20 as a rear wheel, and a longitudinally-mounted engine. With this arrangement, the torque-biasing device 12 functions as a "transaxle-type" torque-biasing device to transfer the torque output away from the rear wheels and towards the front wheels during a reduced-traction condition.

The torque-biasing system 10, however, may be installed and used in any suitable environment. For example, the torque-biasing device 12 may be installed and used in an AWD vehicle, such as a minivan or sedan, having a transversely-mounted engine. With this arrangement, the torque-biasing device functions to transfer the torque output away from the front wheels and towards the rear wheels during a reduced-traction condition. As another example, the torque-biasing device may be installed and used in a two-wheel-drive vehicle having two front wheels with the first wheel 18 as a left wheel and the second wheel 20 as a right wheel. With this arrangement, the torque-biasing device 12 functions as a "front axle-type" torque-biasing device to transfer the torque output away from one of the front wheels and towards the other of the front wheels during a reduced-traction condition.

The torque-biasing device 12 of the preferred embodiment includes a conventional electrically-actuated multi-plate clutch, as typically sold under the trade-name TORQUE ON DEMAND by the BorgWarner company. The torque-biasing device 12 may, however, include other suitable devices, such as a hydraulic or viscous-actuated multi-plate clutch or a gear, dog, or cone-type clutch without a multi-plate. The particular choice for the torque-biasing device 12 may vary based on several factors, including the size and layout of the vehicle 16 and the torque output of the engine 22.

The control unit 14 of the preferred embodiment functions to determine when and how to bias the torque output to the first wheel 18 and to the second wheel 20, and to control the torque-biasing device 12 based on this determination. The first function, determining when and how to bias the torque output, is preferably accomplished in two steps. In the first step, the control unit 14 calculates an error value based upon a difference between the first rotational speed of the first wheel 18 and the second rotational speed of the second wheel 20. In the second step, the control unit 14 derives a control signal based upon proportional and integral terms of the error value with a forgetting factor.

The first step, calculating an error value, is preferably accomplished by receiving data for the first rotational speed and the second rotational speed and by subtracting one value from the other. The data is preferably sent and received in any suitable format and by any suitable means, such as a communications cable. The subtraction value is preferably modified into a positive value. In the preferred embodiment, the data received by the control unit 14 includes the rotational speed of the front axle (an average of the front left wheel and the front right wheel) and the rotational speed of the rear axle (an average of the rear left wheel and the rear right wheel). In other embodiments, the data received by the control unit 14 may include any suitable information based upon the rotational speed of the first wheel 18 and the rotational speed of the second wheel 20.

The second step, deriving the control signal based upon proportional and integral terms of the error value, includes using a forgetting factor. The forgetting factor functions to balance the need to "remember" the recent error values, but to eventually "forget" them and avoid any negative affect on the torque-biasing device 12. The forgetting factor allows the functions to allow the system to use the error value in the calculation until the error value has stabilized for a predetermined length of time. The forgetting factor, of the preferred embodiment includes a time-based exponent in the integral term of the control signal, as shown in the following two equations (the first for discrete control and the second for continuous control):

$$u_k = k_p x_{e,k} + k_i \sum_{i=1}^{k} \lambda^{k-i} x_{e,i}$$

$$u(t) = k_p x_e + k_i \int_0^t \left(\lambda^{\frac{\tau}{T}} \cdot x_e\right) d\tau$$

where $u_k$ and $u(t)$ are the control signals, $k_p$ is a proportional term constant, $x_{e,k}$ and $x_e$ are the error values, $k_i$ is the integral term constant, T is a constant, $\tau$ is the time based component, and $\lambda$ is the forgetting factor. Once the error value has stabilized for a predetermined length of time, the forgetting factor functions to allow the system to stop using the error value when calculating the control signal. In the preferred embodiment, $\lambda$ is about 0.9. In alternative embodiments, however, $\lambda$ may be any suitable value between 0.0 and 1.0.

In the preferred embodiment, the control unit 14 actually varies the "constants" $k_p$, $k_i$, and $\lambda$ based upon a particular condition of the vehicle 16. More particularly, the control unit 14 increases $k_p$, $k_i$, and $\lambda$ based upon a wide-open engine throttle detection by a conventional engine throttle sensor to increase the emphasis of the importance of the rotational speed difference. In alternative embodiments, the control unit 14 may hold constant one or more of the "constants" $k_p$, $k_i$, and $\lambda$, or may vary one or more of these "constants" based upon other suitable factors.

The second function of the control unit 14, controlling the torque-biasing device 12, is preferably accomplished by sending the control signal to the torque-biasing device 12. The control signal is preferably sent and received in any suitable format and by any suitable means, such as a communications cable.

As any person skilled in the art of torque-biasing systems will recognize from the previous detailed description and from the figures and claims, modifications and changes can be made to the preferred embodiments of the invention without departing from the scope of this invention defined in the following claims.

We claim:

1. A method for controlling a torque-biasing device in a vehicle having a first wheel with a first rotational speed and a second wheel with a second rotational speed comprising:
    calculating an error value based upon the difference between the first rotational speed and the second rotational speed;
    deriving a control signal based upon proportional and integral terms of the error value; and
    sending the control signal to the torque-biasing device;
    wherein said deriving includes using a forgetting factor in the integral term having a time based exponent, the forgetting factor acting to allow the device to stop using the error value once the error value has stabilized for a predetermined time period.
2. The method for controlling the torque-biasing device of claim 1, wherein said deriving includes using the following equation:

$$u(t) = k_p x_e + k_i \int_0^t \left(\lambda^{\frac{\tau}{T}} \cdot x_e\right) d\tau$$

wherein u(t) is the control signal for time t, $k_p$ is a proportional term constant, $x_e$ is the error value, $k_i$ is an integral term constant. T is a constant, $\tau$ is the time based component, and $\lambda$ is the forgetting factor.

3. The method for controlling the torque-biasing device of claim 2, further comprising varying at least one of the $k_p$, $k_i$, and $\lambda$ parameters based upon a particular vehicle condition.

4. The method for controlling the torque-biasing device of claim 3, wherein said varying includes increasing one of the $k_p$, $k_i$, and $\lambda$ parameters based on a wide-open engine throttle condition.

5. The method for controlling the torque-biasing device of claim 1, further comprising receiving data on the first rotational speed and the second rotational speed.

6. A torque-biasing system for a vehicle having a first wheel with a first rotational speed and a second wheel with a second rotational speed, comprising:
    a torque-biasing device;
    a control unit adapted to calculate an error value based upon a difference between the first rotational speed and the second rotational speed, to derive a control signal based upon proportional end integral terms of the error value, and to send the control signal to said torque-biasing device;
    wherein said control unit is further adapted to derive the control signal with a forgetting factor in the integral term having a time based exponent, the forgetting factor acting to allow the system to stop using the error value once the error value has stabilized for a predetermined time period.

7. The torque-biasing system for a vehicle of claim 6, wherein said control unit is further adapted to derive the control signal according to the following equation:

$$u(t) = k_p x_e + k_i \int_0^t \left(\lambda^{\frac{\tau}{T}} \cdot x_e\right) d\tau$$

wherein u(t) is the control signal for time t, $k_p$ is a proportional term constant, $x_e$ is the error value, $k_i$ is an integral term constant, T is a constant, $\tau$ is the time based component, and $\lambda$ is the forgetting factor.

8. The torque-biasing system for a vehicle of claim 7, wherein said control unit is further adapted to vary at least one of the $k_p$, $k_i$, and $\lambda$ parameters based upon a wide-open engine throttle condition.

9. The torque-biasing system for a vehicle of claim 8, wherein said control unit is further adapted to increase at least one of the $k_p$, $k_i$, and $\lambda$ parameters based upon a particular vehicle condition.

10. The torque-biasing system for a vehicle of claim 6, wherein said torque-biasing device is adapted to selectively bias torque toward the first wheel or toward the second wheel.

11. The torque-biasing system for a vehicle of claim 10, wherein the first wheel is located at a front end of the vehicle and the second wheel is located at a rear end of the vehicle.

12. The torque-biasing system for a vehicle of claim 6, wherein said control unit is further adapted to receive data on the first rotational speed and the second rotational speed.

* * * * *